[19] US 11,831,568 B2

(12) United States Patent
Shaked et al.

(10) Patent No.: US 11,831,568 B2
(45) Date of Patent: Nov. 28, 2023

(54) TECHNIQUES FOR PHASE TRACKING TO ENABLE HIGHER MODULATION ORDERS IN WIRELESS COMMUNICATIONS

(71) Applicant: QUALCOMM Incorporated, San Diego, CA (US)

(72) Inventors: Ronen Shaked, Kfar Saba (IL); Assaf Touboul, Netanya (IL); Guy Wolf, Rosh Haayin (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/454,761

(22) Filed: Nov. 12, 2021

(65) Prior Publication Data
US 2022/0077974 A1  Mar. 10, 2022

Related U.S. Application Data

(63) Continuation of application No. 16/803,648, filed on Feb. 27, 2020, now Pat. No. 11,271,690.

(51) Int. Cl.
*H04L 5/00* (2006.01)
*H04L 1/00* (2006.01)

(52) U.S. Cl.
CPC .......... *H04L 5/001* (2013.01); *H04L 1/0071* (2013.01); *H04L 5/0044* (2013.01); *H04L 5/0048* (2013.01)

(58) Field of Classification Search
CPC ..... H04L 5/001; H04L 1/0071; H04L 5/0044; H04L 5/0048; H04L 25/0226;
(Continued)

(56) References Cited

U.S. PATENT DOCUMENTS

2008/0107161 A1   5/2008  Xu et al.
2010/0177723 A1 *  7/2010  Kim ............... H04L 5/0048
                                                              370/329

(Continued)

FOREIGN PATENT DOCUMENTS

EP        3644540 A1    4/2020
WO     2018064313 A1    4/2018
WO     2019024664 A1    2/2019

OTHER PUBLICATIONS

Huawei, et al., "Discussion on Reference Signal Design", 3GPP Draft, 3GPP TSG RAN WG1 Meeting #86, R1-167204, 3rd Generation Partnership Project (3GPP), Mobile Competence Centre; 650, Route Des Lucioles; F-06921, Sophia-Antipolis Cedex; France, vol. RAN WG1, No. Gothenburg, Sweden: Aug. 22, 2016-Aug. 26, 2016, Aug. 12, 2016 (Aug. 12, 2016), XP051142225, 3 pages, Retrieved from the Internet: URL: http://www.3gpp.org/ftp/tsg_ran/WG1_RL1/TSGR1_86/Docs/ [retrieved on Aug. 12, 2016] paragraph [02.1]—paragraph [02.2].
(Continued)

*Primary Examiner* — Kabir A Timory
(74) *Attorney, Agent, or Firm* — QUALCOMM Incorporated

(57) ABSTRACT

Aspects described herein relate receiving a signal having a waveform including, within a symbol, resource elements for a physical downlink shared channel (PDSCH) and separate resource elements for multiple pilots to enable phase tracking, estimating, based on the multiple pilots, a channel response of the PDSCH, and removing, from the signal, a phase noise computed based on the channel response estimated for the PDSCH.

26 Claims, 7 Drawing Sheets

(58) Field of Classification Search
CPC . H04L 5/0026; H04L 5/0039; H04L 27/3455; H04L 27/362; H04L 27/26134
See application file for complete search history.

(56) References Cited

U.S. PATENT DOCUMENTS

| | | | |
|---|---|---|---|
| 2016/0127094 A1 | 5/2016 | Jiang et al. | |
| 2020/0007369 A1* | 1/2020 | Ciochina-Duchesne | ................... H04L 27/2607 |
| 2020/0220677 A1* | 7/2020 | Interdonato | ........... H04L 5/0048 |
| 2020/0252184 A1* | 8/2020 | Kundargi | ............. H04B 7/0626 |
| 2021/0273755 A1 | 9/2021 | Shaked et al. | |

OTHER PUBLICATIONS

Huawei, et al., "Reference Signal Design for Phase Noise Compensation in HF", 3GPP Draft, 3GPP TSG RAN WG1 Meeting #86bis, R1-1608822, 3rd Generation Partnership Project (3GPP), Mobile Competence Centre; 650, Route Des Lucioles; F-06921, Sophia-Antipolis Cedex; France, vol. RAN WG1, No. Lisbon, Portugal, Oct. 10, 2016-Oct. 14, 2016, Oct. 9, 2016 (Oct. 9, 2016), XP051148876, 5 pages, Retrieved from the Internet: URL: http://www.3gpp.org/ftp/Meetings_3GPP_SYNC/RAN1/Docs/ [retrieved on Oct. 9, 2016] figure 4 paragraph [03.1] paragraph [04.2].
International Search Report and Written Opinion—PCT/US2021/018921—ISA/EPO—dated May 18, 2021.
Levanen T., et al., "Mobile Communications Beyond 52.6 GHz: Waveforms, Numerology, and Phase Noise Challenge", arxiv.org, Cornell University Library, 201 OLIN Library Cornell University Ithaca, NY 14853, Dec. 19, 2019 (Dec. 19, 2019), XP081569400, 8 pages, figure 2.
Syrjala V., et al., "Pilot Allocation and Computationally Efficient Non-Iterative Estimation of Phase Noise in OFDM", IEEE Wireless Communications Letters, IEEE, Piscataway, NJ, USA, vol. 8, No. 2, Apr. 1, 2019 (Apr. 1, 2019), pp. 640-643, XP011719199, ISSN: 2162-2337, DOI: 10.1109/LWC.2018.2890665 [retrieved on Apr. 8, 2019] paragraph [0001]—paragraph [0111].
Tervo O., et al., "5G New Radio Evolution Towards Sub-THz Communications", arxiv.org, Cornell University Library, 201 OLIN Library Cornell University Ithaca, NY 14853, Feb. 7, 2020 (Feb. 7, 2020), XP081594350, 6 pages, paragraph [0IIC].
ZTE: "Discussion on RS for Phase Tracking", 3GPP Draft, 3GPP TSG RAN WG1 Meeting #89, R1-1707132, 3rd Generation Partnership Project (3GPP), Mobile Competence Centre, 650, Route Des Lucioles, F-06921 Sophia-Antipolis Cedex, France, vol. RAN WG1, No. Hangzhou, CHN, May 14, 2017-May 19, 2017, May 14, 2017 (May 14, 2107), XP051272358, 11 Pages, May 7, 2017, paragraph [0001]—paragraph [02.2] figure 3, paragraph [02.4].

* cited by examiner

TECHNIQUES FOR PHASE TRACKING TO ENABLE HIGHER MODULATION ORDERS IN WIRELESS COMMUNICATIONS

CLAIM OF PRIORITY UNDER 35 U.S.C. § 119

The present Application for Patent is a continuation of patent application Ser. No. 16/803,648, entitled "TECHNIQUES FOR PHASE TRACKING TO ENABLE HIGHER MODULATION ORDERS IN WIRELESS COMMUNICATIONS" filed Feb. 27, 2020, which is assigned to the assignee hereof and hereby expressly incorporated by reference herein for all purposes.

BACKGROUND

Aspects of the present disclosure relate generally to wireless communication systems, and more particularly, to phase tracking.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In many wireless communication technologies, communications occur between nodes of the network, which may include user equipment (UEs), base stations (e.g., gNBs), etc., using modulation schemes to modulate data into signals for transmission over-the-air. In 5G NR, modulation schemes are limited to 256 quadrature amplitude modulation (QAM) due to various radio frequency (RF) noise floors.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a user equipment (UE) is provided. The method includes receiving a signal having a waveform including, within a symbol, resource elements for a physical downlink shared channel (PDSCH) and separate resource elements for multiple pilots to enable phase tracking, estimating, based on the multiple pilots, a channel response of the PDSCH, and removing, from the signal, a phase noise computed based on the channel response estimated for the PDSCH.

In another example, an apparatus for wireless communication is provided that includes a transceiver, a memory, and one or more processors communicatively coupled with the transceiver and the memory. The one or more processors are configured to receive a signal having a waveform including, within a symbol, resource elements for a PDSCH and separate resource elements for multiple pilots to enable phase tracking, estimate, based on the multiple pilots, a channel response of the PDSCH, and remove, from the signal, a phase noise computed based on the channel response estimated for the PDSCH.

In another example, an apparatus for wireless communication is provided that includes means for receiving a signal having a waveform including, within a symbol, resource elements for a PDSCH and separate resource elements for multiple pilots to enable phase tracking, means for estimating, based on the multiple pilots, a channel response of the PDSCH, and means for removing, from the signal, a phase noise computed based on the channel response estimated for the PDSCH.

In another example, a non-transitory computer-readable medium including code executable by one or more processors for wireless communications is provided. The code includes code for receiving a signal having a waveform including, within a symbol, resource elements for a PDSCH and separate resource elements for multiple pilots to enable phase tracking, estimating, based on the multiple pilots, a channel response of the PDSCH, and removing, from the signal, a phase noise computed based on the channel response estimated for the PDSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
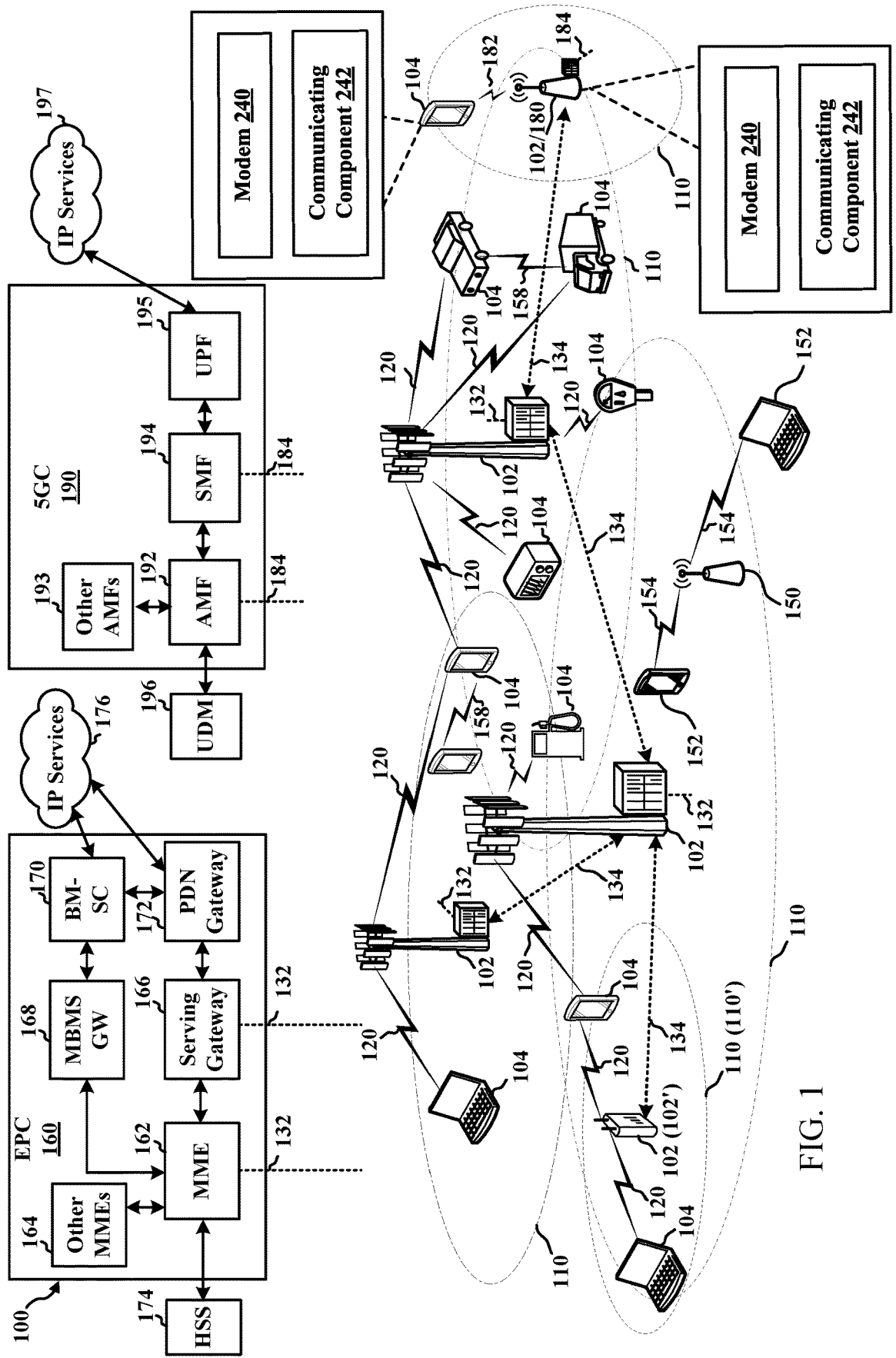
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to generating signals with pilot patterns to enable higher modulation schemes in wireless communications. In an example, nodes communicating in a wireless network can transmit signals with pilot patterns to enable phase noise suppression that can allow for achieving the higher modulation orders. For example, the pilot pattern can include transmitting multiple pilots per signal. In one example, the multiple pilots can be interleaved in frequency resource elements (REs) of the signal. In another example, the multiple pilots can be in adjacent frequency REs of the signal. In addition, for example, the multiple pilots can be generated according to a sequence (e.g., a Zadoff-Chu sequence, pseudo-noise (PN) sequence, etc.). In any case, transmitting a signal with multiple pilots can enable improved phase noise suppression, which can all for achieving higher modulation order.

Currently in fifth generation (5G) new radio (NR), modulation schemes are limited to 256 quadrature amplitude modulation (QAM) due to various radio frequency (RF) noise floors. One of the dominant floors is phase noise arising from the transmit (Tx) and/or receive (Rx) local oscillators (LOs). Cancellation of this noise floor can enable significant increase of modulation order to enable modulation orders up to 16,384 QAM (16K-QAM), 1,048,576 QAM (1M-QAM), etc., which can also result in increased throughput for communications (e.g., going from 8 bits per second (bps)/Hertz (Hz) to 14 or even 20 bps/Hz can introduce a 75%-150% increase in throughput). For example, signal-to-noise ratio (SNR) with code to achieve 16K-QAM can be ~42 decibel (dB), and to achieve 1M-QAM can be ~60 dB. In a specific example, in a first phase noise model of −96 dBc/Hz @ 100 Kilohertz (KHz), an integrated noise floor can be ~35 dBc. In another specific example, in a second phase noise model of −106 dBc/Hz @ 100 KHz, an integrated noise floor can be −45 dBc. Thus, even with infinite thermal SNR, the net available SNR is capped to this floor (e.g., 35 dB or 45 dB). Removal of dominant phase noise floors such as these, as described herein, can help to achieve these higher modulation orders. Using additional pilots can allow for suppressing phase noise to enable the higher modulation orders.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for generating a waveform with multiple pilots and/or performing phase noise suppression on a received waveform based on multiple pilots, as described herein. In particular, a UE 104 and base station 102/gNB 180 are shown as having the modem 240 and communicating component 242. This is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of one node (e.g., a base station 102/gNB 180) can transmit a signal with a waveform having multiple pilots to allow for improved phase noise suppression. A communicating component 242 of another node (e.g., a UE 104) can receive the signal and can perform the phase noise suppression based on the multiple pilots, which can allow for achieving a higher modulation order. Thus, for example, the node transmitting the signal can generate the signal based on the higher modulation order (e.g., 16K-QAM, 1M-QAM, etc.).

Figure 2:
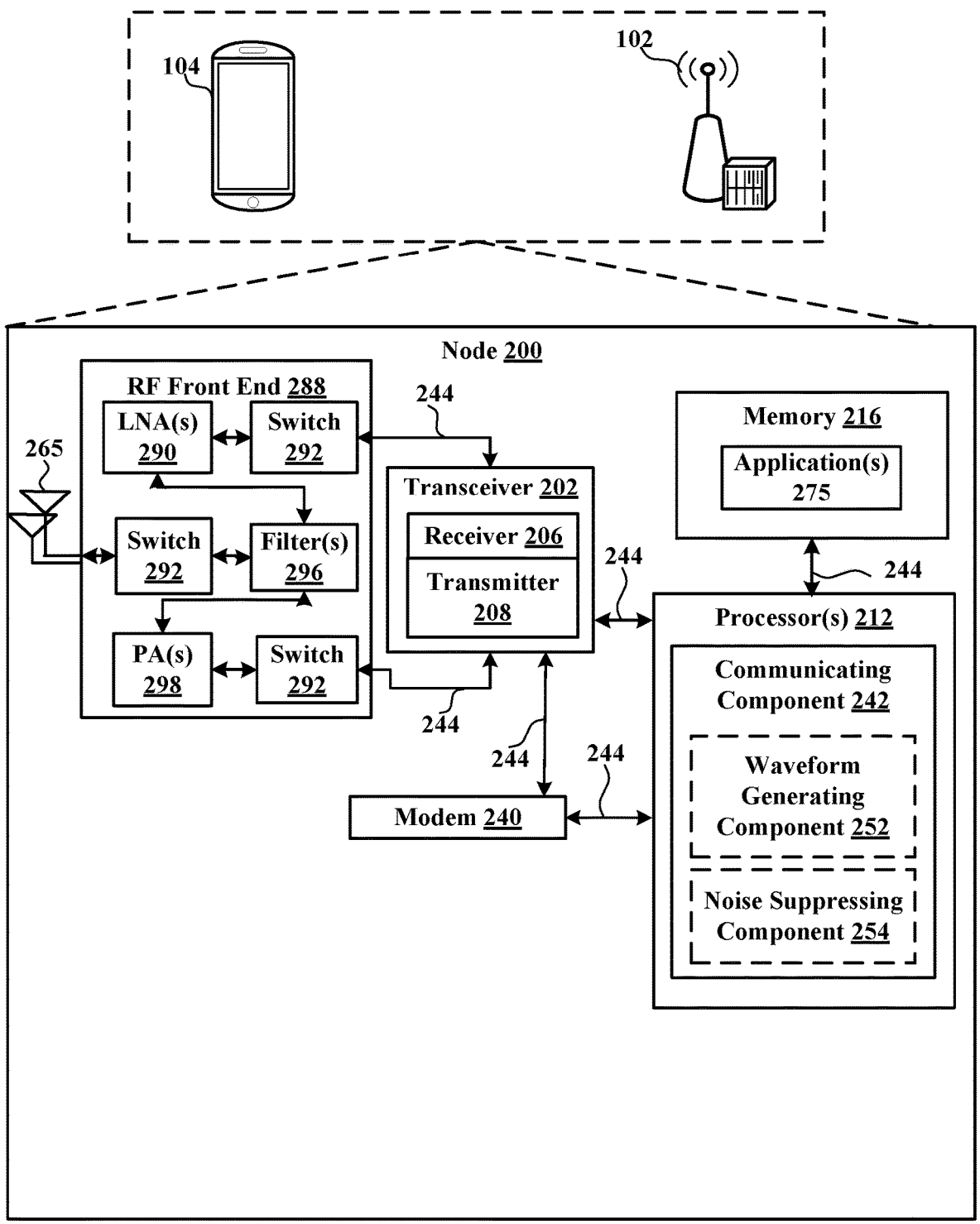
FIG. 2 is a block diagram illustrating an example of a node, in accordance with various aspects of the present disclosure.
Figure 3:
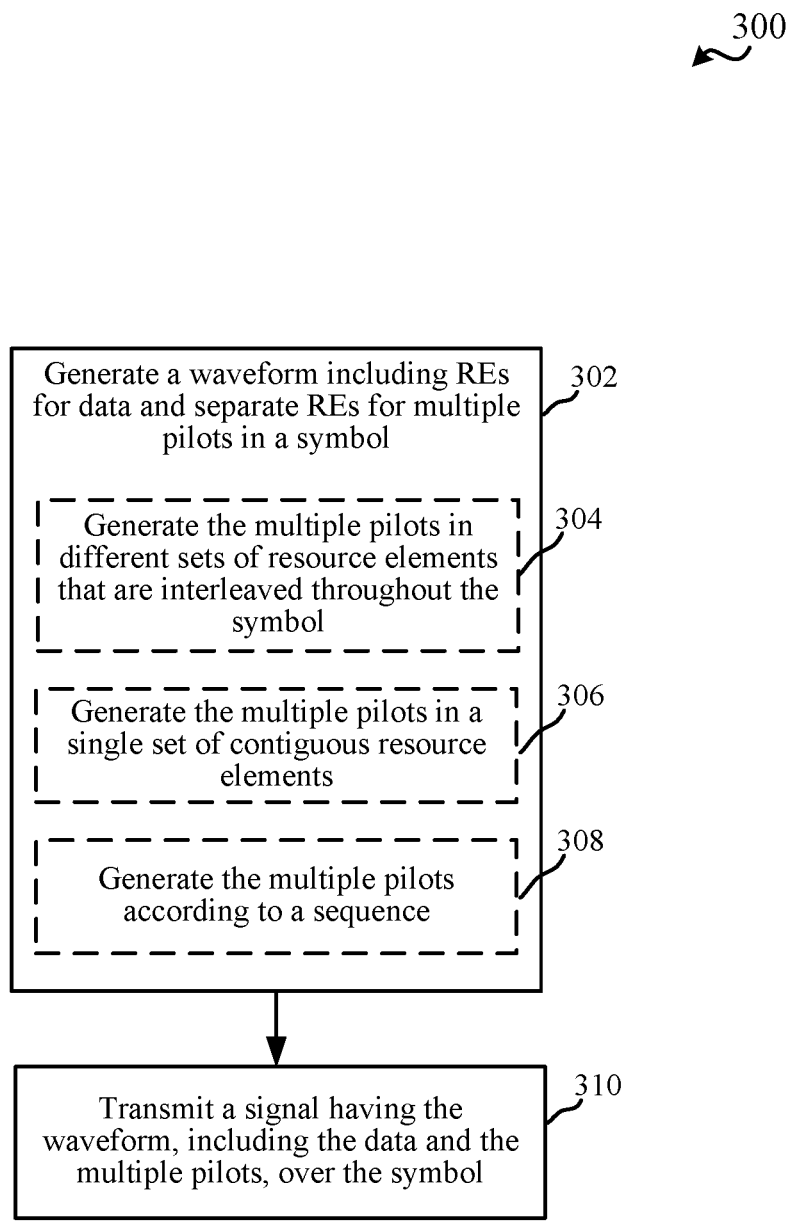
FIG. 3 is a flow chart illustrating an example of a method for generating a waveform with multiple pilots, in accordance with various aspects of the present disclosure.
Figure 4:
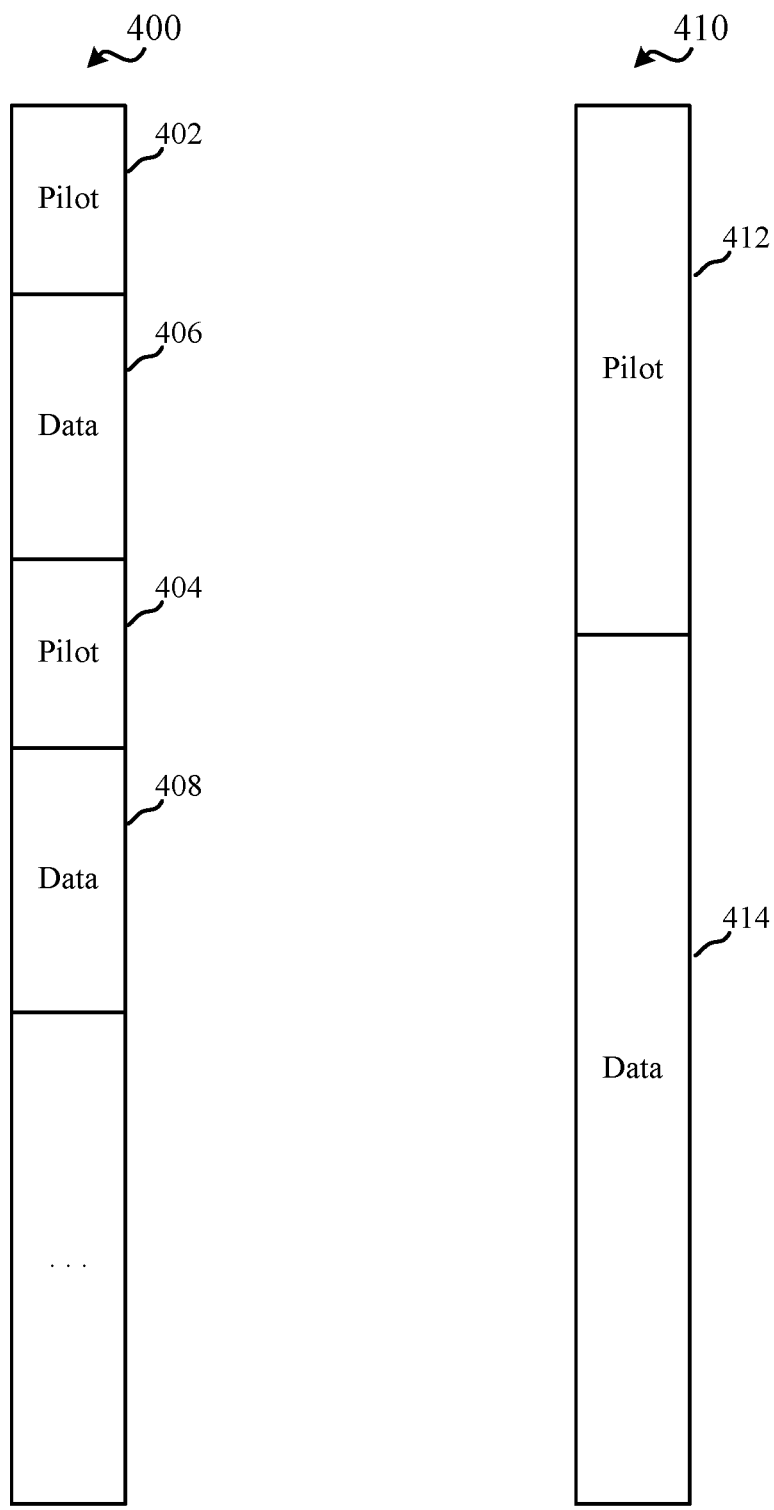
FIG. 4 illustrates examples of waveform configurations including resource elements for multiple pilots, in accordance with various aspects of the present disclosure.
Figure 5:
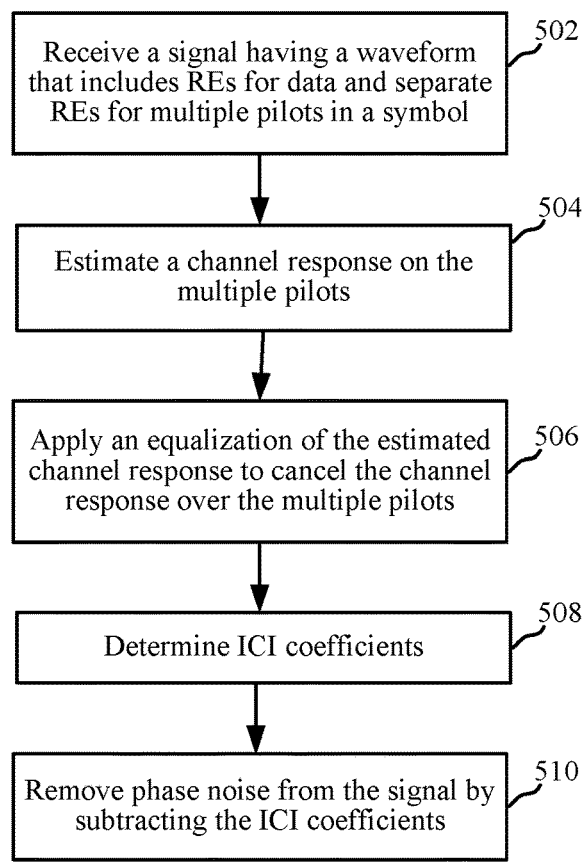
FIG. 5 illustrates an example of a method for canceling phase noise from a waveform in a frequency domain, in accordance with various aspects of the present disclosure.
Figure 6:
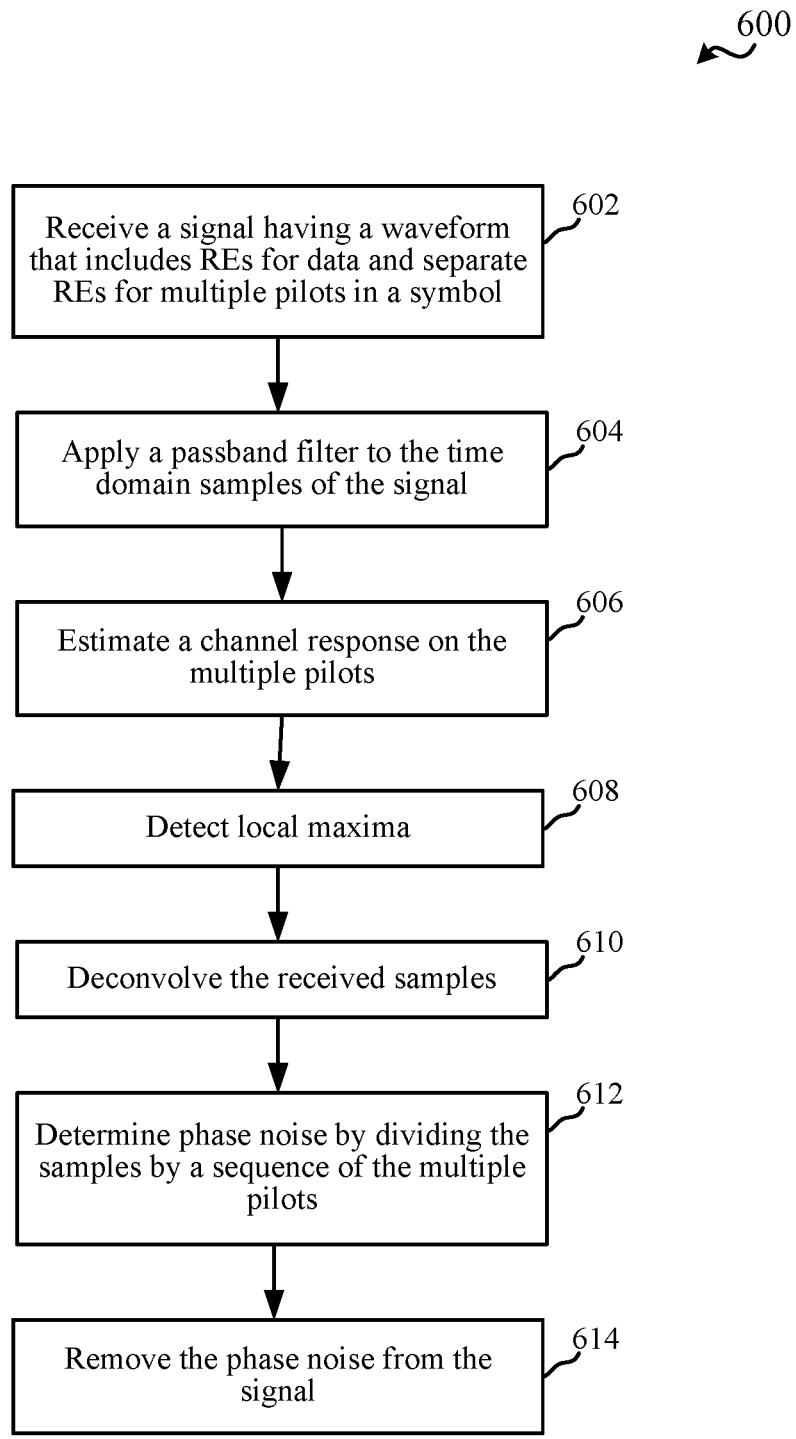
FIG. 6 illustrates an example of a method for canceling phase noise from a waveform in a time domain, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 3, 5, and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of a node 200, which can include a UE 104, base station 102/gNB 180, and/or substantially any node that can perform wireless communications. The node 200 may include a variety of components, some of which have already been described above and are described further herein, including components such as one or more processors 212 and memory 216 and transceiver 202 in communication via one or more buses 244, which may operate in conjunction with modem 240 and/or communicating component 242 for communicating using waveforms having multiple pilots, performing phase noise suppression on signals having such waveforms, etc., as described further herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when node 200 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by another node in the wireless network. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, node 200 may include RF front end 288, which may operate in communication with one or more antennas 265 and transceiver 202 for receiving and transmitting radio transmissions, for example, wireless communications transmitted by another node or wireless transmissions transmitted by node 200. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that node 200 can communicate with, for example, one or more other nodes. In an aspect, for example, modem 240 can configure transceiver 202 to operate at a specified frequency and power level based on the configuration of the node 200 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of node 200 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on configuration information associated with node 200.

In an aspect, communicating component 242 can optionally include a waveform generating component 252 for generating waveforms for transmitting signals that include multiple pilots, a noise suppressing component 254 for performing phase noise suppression on received signals having waveforms with multiple pilots, etc., as described further herein.

In an aspect, the processor(s) 212 may correspond to one or more of the processors described in connection with the UE or base station in FIG. 7. Similarly, the memory 216 may correspond to the memory described in connection with the UE or base station in FIG. 7.

FIG. 3 illustrates a flow chart of an example of a method 300 for generating a waveform having multiple pilots. In an example, a base station 102/gNB 180, UE 104, or other node capable of wireless communications, can perform the functions described in method 300 using one or more of the components described in FIGS. 1-2.

In method 300, at Block 302, a waveform including REs for data and separate REs for multiple pilots in a symbol can be generated. In an aspect, waveform generating component 252, e.g., in conjunction with processor(s) 212, memory 216, transceiver 202, communicating component 242, etc., can generate the waveform including the REs for data and separate REs for multiple pilots in the symbol. For example, the waveform can be generated over a collection of frequency resources in a period of time. For example, the collection of frequency resources can include multiple subcarriers in a frequency spectrum that can be defined for communications between devices. In addition, for example, the period of time can include an orthogonal frequency division multiplexing (OFDM) symbol, single carrier frequency division multiplexing (SC-FDM) symbol, and/or the like. In some wireless communication technologies, such as 5G NR, an RE may be defined as a subcarrier within a symbol, and multiple REs (e.g., 12 REs) can be defined as a resource block (RB). Though concepts are generally described herein in terms of REs, the concepts can be similarly applied to other divisions of time and frequency resources (in other wireless communication systems) to achieve the desired functions. In any case, as described, including multiple pilots within the signal can allow for improved phase noise suppression, which may allow for achieving higher modulation orders and increased throughput, etc.

In generating the waveform at Block 302, optionally at Block 304, the multiple pilots can be generated in different sets of REs that are interleaved throughout the symbol. In an aspect, waveform generating component 252, e.g., in conjunction with processor(s) 212, memory 216, transceiver 202, communicating component 242, etc., can generate the multiple pilots in the different sets of REs that are interleaved (in frequency) throughout the symbol. For example, each set of REs can include contiguous REs, but the sets may be dispersed throughout REs of the symbol such that data REs can be between the sets. For example, the symbol can include, in order of frequency, a set of REs for a first pilot, followed by a set of REs for data, followed by a set of REs for a second pilot, followed by a set of REs for data, and so on. In one example, the sets of REs for pilots can be of the same or substantially similar length. In addition, for example, the sets of REs for data can be of the same or substantially similar length. Moreover, in one example, each of the multiple pilots can correspond to one of the sets of data REs, and can be used to suppress phase noise for that set of data REs. An example is shown in FIG. 4.

FIG. 4 illustrates an example of a waveform 400 having pilot REs 402, 404 that are interleaved between data REs 406, and also data REs 408. Data can be mapped to the data REs 406, 408 with pilot REs interspersed between the data. This is one example of a waveform structure for having multiple pilots. In one example, having alternating pilot REs in the waveform may be used where a receiver estimates and cancels phase noise in a frequency domain.

In generating the waveform at Block 302, optionally at Block 306, the multiple pilots can be generated in a single set of contiguous REs. In an aspect, waveform generating component 252, e.g., in conjunction with processor(s) 212, memory 216, transceiver 202, communicating component 242, etc., can generate the multiple pilots in the contiguous set of REs in the symbol. For example, For example, the symbol can include, in order of frequency, a set of REs for the multiple pilots, followed by a set of REs for data. In another example, the set of REs for the multiple pilots may be at the end of the frequency resources for the symbol, somewhere in the middle of the REs, and/or the like. Moreover, in one example, each of the multiple pilots can correspond to a portion of REs in the data REs, and can be used to suppress phase noise for that portion of data REs. An example is shown in FIG. 4.

FIG. 4 illustrates an example of a waveform 410 having pilot REs 412 and data REs 414. Data can be mapped to the data REs 414 and the pilot REs 412 may be contiguous within the REs of the symbol. This is one example of a waveform structure for having multiple pilots. In one example, having the multiple pilots in a set of contiguous REs in the waveform may be used where a receiver estimates and cancels phase noise in a time domain.

In generating the waveform at Block 302, optionally at Block 308, the multiple pilots can be generated according to a sequence. In an aspect, waveform generating component 252, e.g., in conjunction with processor(s) 212, memory 216, transceiver 202, communicating component 242, etc., can generate the multiple pilots according to the pilot sequence, which may facilitate improved detection and channel response estimation. For example, the sequence may be a Zadoff-Chu sequence, a PN sequence (e.g., a pseudo-random binary sequence (PRBS)), which may be generated by linear feedback shift registers, and/or substantially any sequence that can be used to generate an approximately white signal. In an example, waveform generating component 252 can generate each of the multiple pilots to be of a pilot sequence, which may be the same or different for each of the multiple pilots within a symbol, may vary for pilots as transmitted across multiple symbols, and/or the like.

In method 300, at Block 310, a signal having the waveform, including the data and the multiple pilots, over the symbol can be transmitted. In an aspect, communicating component 242, e.g., in conjunction with processor(s) 212, memory 216, transceiver 202, etc., can transmit the signal having the waveform, including the data and the multiple pilots, over the symbol. In one example, as described generating the waveform to have multiple pilots may allow for higher order modulation, and thus communicating component 242 can modulate the signal based on the higher modulation order (e.g., 16K-QAM, 1M-QAM, etc.). In any case, a node receiving the signal can perform phase noise suppression based on the multiple pilots, which can allow for more effective noise suppression.

FIG. 5 illustrates a flow chart of an example of a method 500 for performing frequency domain noise suppression of a waveform having multiple pilots. In an example, a base station 102/gNB 180, UE 104, or other node capable of wireless communications, can perform the functions described in method 500 using one or more of the components described in FIGS. 1-2.

In method 500, at Block 502, a signal having a waveform that includes REs for data and separate REs for multiple pilots in a symbol can be received. In an aspect, communicating component 242, e.g., in conjunction with processor(s) 212, memory 216, transceiver 202, etc., can receive (e.g., from another node) the signal having the waveform that includes REs for data and separate REs for multiple pilots in the symbol. As described, for example, the waveform may have pilot REs that are interleaved with data REs throughout the waveform, or may otherwise have pilot REs that are contiguous in a set of REs in the waveform.

In method 500, at Block 504, a channel response on the multiple pilots can be estimated. In an aspect, noise suppressing component 254, e.g., in conjunction with processor(s) 212, memory 216, transceiver 202, communicating component 242, etc., can estimate the channel response on the multiple pilots. For example, noise suppressing component 254 may know the location of pilot REs within the waveform, which may be based on a received configuration, implemented in instructions in memory 216 (e.g., pursuant to a wireless communication technology standard or protocol), etc. In one example, this may include noise suppressing component 254 determining which of the pilots are dedicated to phase noise cancellation, or receiving an external channel estimation (e.g., from a demodulation reference signal received from the other node). Moreover, for example, noise suppressing component 254 can estimate the channel response on each of the multiple pilots in turn, or as a total channel response over all of the pilots, etc.

In method 500, at Block 506, an equalization of the estimated channel response can be applied to cancel the channel response over the multiple pilots. In an aspect, noise suppressing component 254, e.g., in conjunction with processor(s) 212, memory 216, transceiver 202, communicating component 242, etc., can apply the equalization of the estimated channel response to cancel the channel response over the multiple pilots. For example, the equalization can be an average or another representation of the channel response estimated on the multiple pilots.

In method 500, at Block 508, inter-carrier interference (ICI) coefficients can be determined. In an aspect, noise suppressing component 254, e.g., in conjunction with processor(s) 212, memory 216, transceiver 202, communicating component 242, etc., can determine the ICI coefficients, which may be based on the applying the channel estimation equalization to cancel the channel response over the pilots. For example, noise suppressing component 254 may determine the ICI coefficients as an estimation of leakage coefficients from all subcarriers to all subcarriers (carried out over the pilots), once the channel response is cancelled over the pilots.

In method 500, at Block 510, phase noise from the signal can be removed by subtracting the ICI coefficients. In an aspect, noise suppressing component 254, e.g., in conjunction with processor(s) 212, memory 216, transceiver 202, communicating component 242, etc., can remove (or suppress) the phase noise from the signal by subtracting the ICI coefficients. In one example, this can be performed using hard-decisions on the unknown data REs. For example, The ICI coefficients estimation can be based not only on pilots but also on the data, or on hard decision on the data. A hard decision on the data can be a slicer unit which finds, from the quadrature amplitude modulation (QAM) map, the closest symbol to the received symbol. Then these hard decision data symbols can be used like the pilots to estimate the ICI coefficients. This process can be iteratively performed, e.g., in each iteration the ICI coefficients can be estimated, then ICI correction can be applied, then improved hard decisions can be made on the data and again ICI coefficients can be estimated with improved accuracy (e.g., using a number of iterations). In addition, for example, this process of subtracting the ICI coefficients can be done iteratively, (e.g., feed the input to this module, feed the output of the phase noise removed signal as input into the function for estimating ICI coefficients to decrease the symbol-error rate in the hard-decision operation).

FIG. 6 illustrates a flow chart of an example of a method 600 for performing time domain noise suppression of a waveform having multiple pilots. In an example, a base station 102/gNB 180, UE 104, or other node capable of wireless communications, can perform the functions described in method 600 using one or more of the components described in FIGS. 1-2.

In method 600, at Block 602, a signal having a waveform that includes REs for data and separate REs for multiple pilots in a symbol can be received. In an aspect, communicating component 242, e.g., in conjunction with processor(s) 212, memory 216, transceiver 202, etc., can receive (e.g., from another node) the signal having the waveform that includes REs for data and separate REs for multiple pilots in the symbol. As described, for example, the waveform may have pilot REs that are interleaved with data REs throughout the waveform, or may otherwise have pilot REs that are contiguous in a set of REs in the waveform.

In method 600, at Block 604, a passband filter can be applied to time domain samples of the signal. In an aspect, noise suppressing component 254, e.g., in conjunction with processor(s) 212, memory 216, transceiver 202, communicating component 242, etc., can apply the passband filter to the time domain samples of the signal. The passband can be the band of the pilots, such that the pilot portion of the samples is output.

In method 600, at Block 606, a channel response can be estimated on the multiple pilots. In an aspect, noise suppressing component 254, e.g., in conjunction with processor(s) 212, memory 216, transceiver 202, communicating component 242, etc., can estimate the channel response on the multiple pilots that are output from the passband filter. For example, noise suppressing component 254 can estimate the channel response, h[n], in the time domain by applying cross-correlation between the received samples r[n] and the reference pilots sequence p[n], e.g. a Zadoff-Chu sequence, PN sequence, or another white sequence, as described above.

In method 600, at Block 608, local maxima can be detected. In an aspect, noise suppressing component 254, e.g., in conjunction with processor(s) 212, memory 216, transceiver 202, communicating component 242, etc., can detect local maxima in the estimated channel responses. For example, noise suppressing component 254 can extract the corresponding (index n0, value a0) as an estimation to the channel impulse response (CIR): h[n=n0]=a0.

In method 600, at Block 610, the received samples can be deconvolved. In an aspect, noise suppressing component 254, e.g., in conjunction with processor(s) 212, memory 216, transceiver 202, communicating component 242, etc., can deconvolve the received samples with the determined local maxima. For example, noise suppressing component 254 can deconvolve the received samples r[n], with h[n] (e.g., where convolving with 1/H(z)) as the equalization.

In method 600, at Block 612, the phase noise can be determined by dividing the samples by a sequence of the multiple pilots. In an aspect, noise suppressing component 254, e.g., in conjunction with processor(s) 212, memory 216, transceiver 202, communicating component 242, etc., can determine the phase noise by dividing the samples by the sequence of the multiple pilots. For example, dividing the samples by the reference sequence p[n], can yield the phase noise.

In method 600, at Block 614, the phase noise can be removed from the signal. In an aspect, noise suppressing component 254, e.g., in conjunction with processor(s) 212, memory 216, transceiver 202, communicating component 242, etc., can remove (or suppress) the phase noise from the signal by canceling the determined phase noise.

Figure 7:
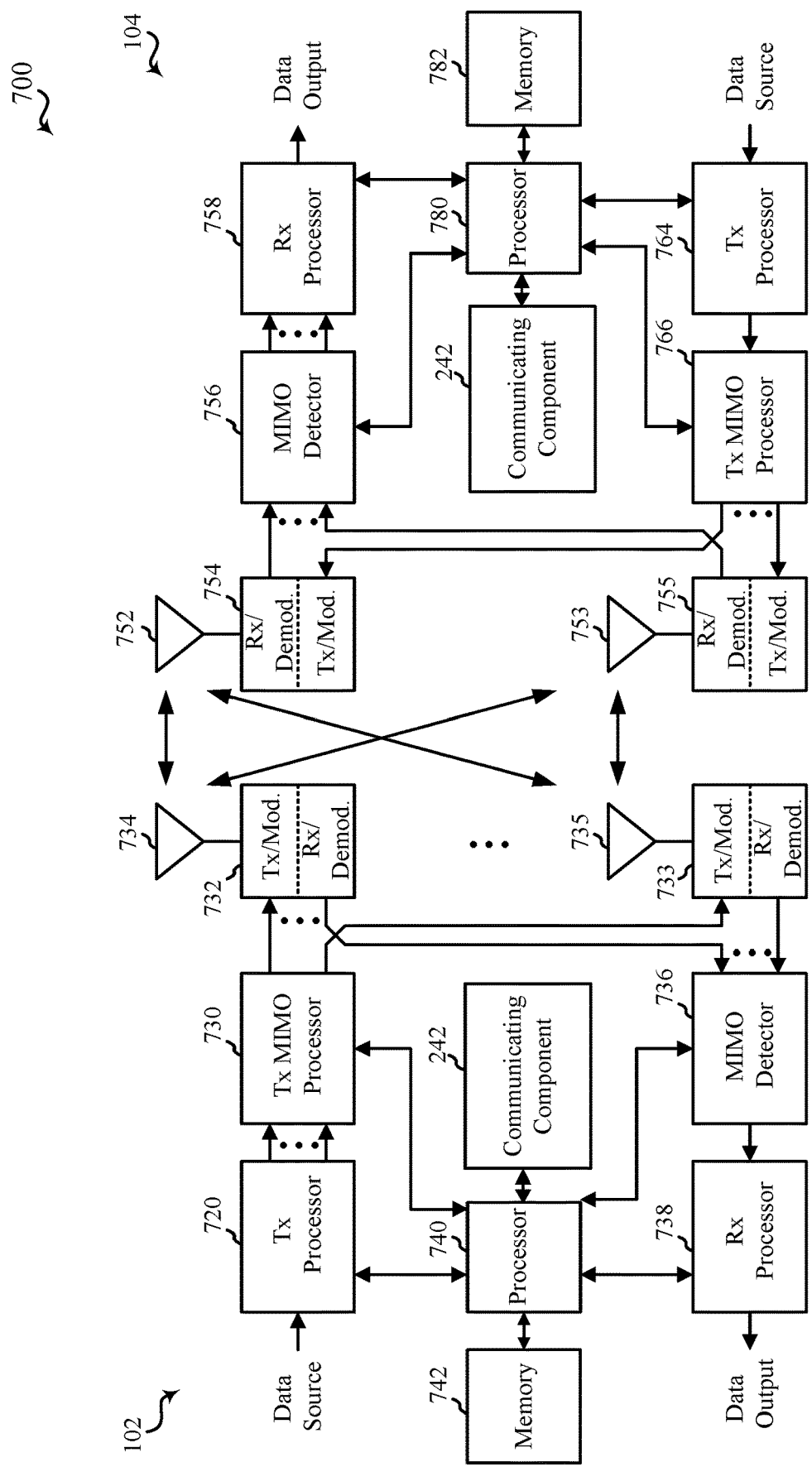
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a communicating component 242 (see e.g., FIGS. 1 and 2).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication at a user equipment (UE), comprising:
   receiving a signal having a waveform including, within a symbol, resource elements for a physical downlink shared channel (PDSCH) and separate resource elements for multiple pilots, wherein each of the multiple pilots corresponds to and enables phase tracking for a different data transmission portion of the PDSCH within the waveform;
   estimating, based on the multiple pilots, a channel response of the PDSCH; and
   removing, from the signal, a phase noise computed based on the channel response estimated for the PDSCH.

2. The method of claim 1, wherein the waveform includes the multiple pilots in different sets of resource elements that are interleaved throughout the symbol.

3. The method of claim 2, wherein the multiple pilots each include a same number of resource elements.

4. The method of claim 1, wherein the waveform includes the multiple pilots in a first single set of contiguous resource elements separate from a second single set of resource elements for the data.

5. The method of claim 1, wherein the waveform includes the multiple pilots according to a sequence.

6. The method of claim 5, wherein the sequence is at least one of a Zadoff-Chu sequence or a pseudo-noise (PN) sequence.

7. The method of claim 1, further comprising applying a passband filter to time domain samples of the signal, wherein estimating the channel response of the PDSCH is based on the time domain samples of the signal having the passband filter applied.

8. An apparatus for wireless communication, comprising:
   one or more memories; and
   one or more processors coupled with the one or more memories, wherein the one or more processors are configured to:
   receive a signal having a waveform including, within a symbol, resource elements for a physical downlink shared channel (PDSCH) and separate resource elements for multiple pilots to, wherein each of the multiple pilots corresponds to and enables phase tracking for a different data transmission portion of the PDSCH within the waveform;
   estimate, based on the multiple pilots, a channel response of the PDSCH; and
   remove, from the signal, a phase noise computed based on the channel response estimated for the PDSCH.

9. The apparatus of claim 8, wherein the waveform includes the multiple pilots in different sets of resource elements that are interleaved throughout the symbol.

10. The apparatus of claim 9, wherein the multiple pilots each include a same number of resource elements.

11. The apparatus of claim 8, wherein the waveform includes the multiple pilots in a first single set of contiguous resource elements separate from a second single set of resource elements for the data.

12. The apparatus of claim 8, wherein the waveform includes the multiple pilots according to a sequence.

13. The apparatus of claim 12, wherein the sequence is at least one of a Zadoff-Chu sequence or a pseudo-noise (PN) sequence.

14. The apparatus of claim 8, wherein the one or more processors are further configured to apply a passband filter to time domain samples of the signal, wherein the one or more processors are configured to estimate the channel response of the PDSCH based on the time domain samples of the signal having the passband filter applied.

15. An apparatus for wireless communication, comprising:
   means for receiving a signal having a waveform including, within a symbol, resource elements for a physical downlink shared channel (PDSCH) and separate resource elements for multiple pilots to, wherein each of the multiple pilots corresponds to and enables phase tracking for a different data transmission portion of the PDSCH within the waveform;
   means for estimating, based on the multiple pilots, a channel response of the PDSCH; and
   means for removing, from the signal, a phase noise computed based on the channel response estimated for the PDSCH.

16. The apparatus of claim 15, wherein the waveform includes the multiple pilots in different sets of resource elements that are interleaved throughout the symbol.

17. The apparatus of claim 16, wherein the multiple pilots each include a same number of resource elements.

18. The apparatus of claim 15, wherein the waveform includes the multiple pilots in a first single set of contiguous resource elements separate from a second single set of resource elements for the data.

19. The apparatus of claim 15, wherein the waveform includes the multiple pilots according to a sequence.

20. The apparatus of claim 19, wherein the sequence is at least one of a Zadoff-Chu sequence or a pseudo-noise (PN) sequence.

21. A non-transitory computer-readable medium, comprising code executable by one or more processors for wireless communications, the code comprising code for:
   receiving a signal having a waveform including, within a symbol, resource elements for a physical downlink shared channel (PDSCH) and separate resource elements for multiple pilots to, wherein each of the multiple pilots corresponds to and enables phase tracking for a different data transmission portion of the PDSCH within the waveform;

estimating, based on the multiple pilots, a channel response of the PDSCH; and removing, from the signal, a phase noise computed based on the channel response estimated for the PDSCH.

22. The non-transitory computer-readable medium of claim 21, wherein the waveform includes the multiple pilots in different sets of resource elements that are interleaved throughout the symbol.

23. The non-transitory computer-readable medium of claim 22, wherein the multiple pilots each include a same number of resource elements.

24. The non-transitory computer-readable medium of claim 21, wherein the waveform includes the multiple pilots in a first single set of contiguous resource elements separate from a second single set of resource elements for the data.

25. The non-transitory computer-readable medium of claim 21, wherein the waveform includes the multiple pilots according to a sequence.

26. The non-transitory computer-readable medium of claim 25, wherein the sequence is at least one of a Zadoff-Chu sequence or a pseudo-noise (PN) sequence.

* * * * *